(12) United States Patent
Sato et al.

(10) Patent No.: US 6,992,700 B1
(45) Date of Patent: Jan. 31, 2006

(54) APPARATUS FOR CORRECTION BASED UPON DETECTING A CAMERA SHAKING

(75) Inventors: Yasuhiro Sato, Hadano (JP); Takashi Kitaguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/391,411

(22) Filed: Sep. 8, 1999

(30) Foreign Application Priority Data

Sep. 8, 1998 (JP) .................................. 10-253657

(51) Int. Cl.
*H04N 5/228* (2006.01)

(52) U.S. Cl. .............................. 348/208.2; 348/208.8; 348/208.11

(58) Field of Classification Search ............ 348/208.2, 348/208.11, 208.8
See application file for complete search history.

(56) References Cited

U.S. PATENT DOCUMENTS

| | | | | |
|---|---|---|---|---|
| 4,689,514 A | * | 8/1987 | Kondoh et al. | 310/323.21 |
| 4,734,726 A | | 3/1988 | Takahashi et al. | |
| 5,155,520 A | * | 10/1992 | Nagasaki et al. | 348/208.99 |
| 5,331,365 A | * | 7/1994 | Miyazawa et al. | 396/52 |
| 5,335,032 A | * | 8/1994 | Onuki et al. | 348/208.99 |
| 5,365,303 A | * | 11/1994 | Yamasaki et al. | 396/53 |
| 5,555,061 A | * | 9/1996 | Soshi et al. | 348/208.2 |
| 5,606,456 A | * | 2/1997 | Nagata et al. | 348/208.11 |
| 5,649,237 A | * | 7/1997 | Okazaki | 348/208.2 |
| 5,946,032 A | * | 8/1999 | Ishizuka et al. | 348/208.8 |
| 6,657,671 B1 | * | 12/2003 | Sasaki | 348/367 |
| 6,686,954 B1 | * | 2/2004 | Kitaguchi et al. | 348/208.1 |
| 6,781,622 B1 | * | 8/2004 | Sato et al. | 348/208.11 |
| 2001/0014171 A1 | * | 8/2001 | Iijima et al. | 382/154 |

FOREIGN PATENT DOCUMENTS

| | | |
|---|---|---|
| EP | 0 611 125 | 8/1994 |
| JP | 1-223413 | 9/1989 |
| JP | 3-145880 | 6/1991 |
| JP | 4-37268 | 2/1992 |
| JP | 4-86730 | 3/1992 |
| JP | 4-95933 | 3/1992 |
| JP | 4-211230 | 8/1992 |
| JP | 05040291 | 2/1993 |
| JP | 05158135 | 6/1993 |
| JP | 05173219 | 7/1993 |
| JP | 06153064 | 5/1994 |
| JP | 07020547 | 1/1995 |
| JP | 07177419 | 7/1995 |

(Continued)

OTHER PUBLICATIONS

Vari-angle, "http://www.usa.canon.com/indtech/broadcasteq/vaplens.htm;".

(Continued)

*Primary Examiner*—Thai Tran
*Assistant Examiner*—Jason Whipkey
(74) *Attorney, Agent, or Firm*—Oblon, Spivak, McClelland, Maier & Neustadt, P.C.

(57) ABSTRACT

An apparatus for detecting a deviation of a camera as a result of the camera shaking, for example resulting from a hand of the camera operator shaking. The apparatus includes a shaking detector which detects a deviation of the camera from shaking based upon an output of angular velocity sensors which are located on different axes of the camera coordinates. A calculator calculates tilt angles of each of the coordinate axes from outputs of the angular velocity sensors. The rotation regulator rotates an image pickup device around an optical axis of the camera or an axis in parallel with the optical axis.

24 Claims, 10 Drawing Sheets

FOREIGN PATENT DOCUMENTS

| | | |
|---|---|---|
| JP | 07218956 | 8/1995 |
| JP | 07225405 | 8/1995 |
| JP | 07264463 A * | 10/1995 |
| JP | 08101418 | 4/1996 |
| JP | 08313955 | 11/1996 |
| JP | 09080502 | 3/1997 |
| JP | 09331476 * | 12/1997 |

OTHER PUBLICATIONS

Distances L, L' "Point to note and how to use of optical device in order to use the optelectronics technique", Tetsuo Sueda, Optelectronics, P36-37.

* cited by examiner

APPARATUS FOR CORRECTION BASED UPON DETECTING A CAMERA SHAKING

BACKGROUND OF THE INVENTION

Field of the Invention

The present invention is generally directed to an apparatus and a method for correction based upon detecting a deviation from a proper position of a camera, and more particularly is directed to an apparatus for correcting deviation from the proper camera position caused by shaking, such as hand shaking.

BACKGROUND OF THE INVENTION

Digital video cameras and digital still cameras as kinds of cameras are well known. When those kinds of cameras shoot a subject, the optical system of such cameras bring rays of light corresponding to the subject to a focus at an image pickup device and change the light information into electric signals.

When camera shaking occurs in a digital video camera by, e.g., hands of the camera operator shaking, pictures taken by the camera slightly oscillate from the camera shaking. As a result, it is hard to watch the reproduced pictures of the digital video camera.

A digital still camera can not realize short exposure time because the sensitivity of the image pickup device is limited. As a result, the digital still camera goes out of focus when the camera shaking occurs. That results in the pictures taken by the digital still camera becoming blurry.

Certain cameras have a function of correcting deviation caused by a slight oscillation based on a hand of an operator holding the camera shaking or by another cause for making the camera shake.

Some methods have been proposed to detect a camera shaking, and such methods utilize devices such as angular velocity sensors, a piezoelectric gyro sensor, an acceleration sensor, and an optical detecting sensor. Another known method corrects a camera shaking by utilizing an image processing method. The most popular method for addressing camera shaking utilizes a piezoelectric gyro sensor for detecting a rotary motion of the camera body.

Furthermore, detecting methods which utilize combinations of the above devices have also been suggested.

When a camera employs a piezoelectric gyro sensor, the piezoelectric gyro sensor detects angular velocity around each axis X, Y, Z of the camera. After the detection of the angular velocity, an optical system of the camera is adjusted along each axis, a vari-angle control mechanism adjusts a variable rotation angle (vari-angle) prism, a reflection mirror in the optical system is adjusted, and an image sensing device is moved appropriately by a motor, etc. Utilizing a piezoelectric gyro sensor as an angular velocity sensor which detects the angular velocities along each of the plural axes has been commercialized in a camera.

A method for detecting angular velocity by pairs of acceleration sensors is disclosed in Japanese Laid Open Patent Application 8-101,418 and Japanese Laid Open Patent Application 05-173,219. In the methods disclosed in those documents, the angular acceleration is detected by differential amplifying an output of plural acceleration sensors.

However, the present inventor has realized that camera shaking is ascribable to rotations based on an up-and-down motion and a side-to-side motion relative to the direction of the optical axis, and based upon rotation around the optical axis. Data corresponding in all directions of the X, Y, Z axes is thereby necessary when a system carries out proper correction for camera shaking.

In Japanese Laid Open Patent Application 07-225,405, the correction of camera shaking based upon angular velocities corresponding to all axes X, Y, Z is disclosed. That document, however, does not disclose the details of the method of the correction of the camera shaking based upon the three angular velocities.

Therefore, the above-noted background art systems can not correct for camera shaking based upon rotations based on an up-and-down motion and a side-to-side motion relative to the direction of the optical axis, and based upon rotation around the optical axis.

SUMMARY OF THE INVENTION

Accordingly, one object of the present invention is to provide a novel system for correcting for any adverse influences generated by a camera shaking.

A more specific object of the present invention is to provide a novel system which overcomes the drawbacks in the background art as noted above.

To solve the above-noted and other problems, according to one aspect of the present invention, an apparatus for detecting a deviation of a camera from shaking includes a shaking detector which detects a shaking of the camera based upon an output from angular velocity sensors located on camera coordinate axes, a calculator which calculates rotation angles of each of the axes based on the output of the angular velocity sensors, and a rotation regulator which rotates an image pickup device around an axis in parallel with the optical axis based on the calculated rotation angles.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
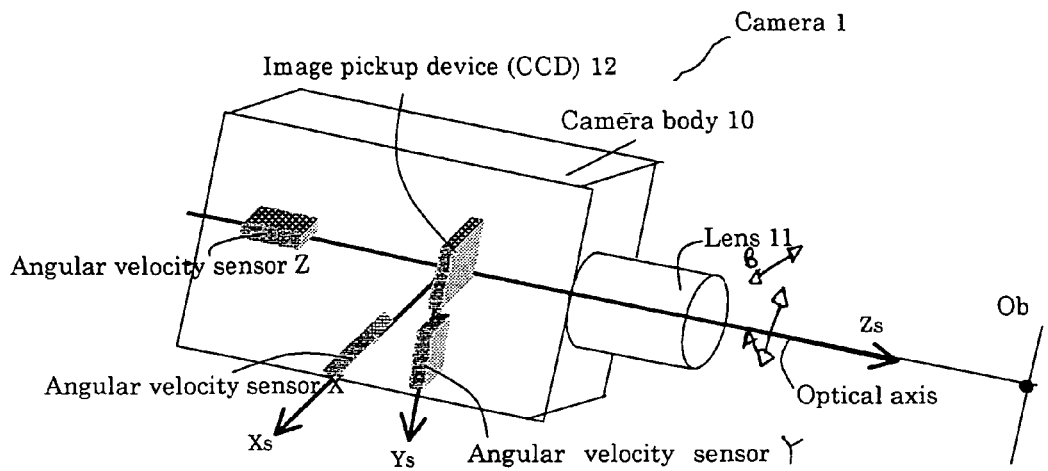
FIG. 1 is a perspective view of a camera according to a first embodiment of the present invention.

A description will now be given of preferred embodiments according to the present invention by referring now to the drawings, wherein like reference numerals designate identical or corresponding structures throughout the views.

FIG. 1 shows one preferred embodiment of a camera 1 with a correction mechanism for correcting camera shaking according to the present invention.

The camera 1 includes a camera body 10 and a lens 11. An angular velocity sensor X, an angular velocity sensor Y, an angular velocity sensor Z, such as piezoelectric gyro sensors, and an image pickup device 12 are set up in the camera body 10. A board (not shown) equipped with a controller and actuators is also set up in the camera body 10. The board equipped with the controller and the actuators is described later. In this embodiment, the image pickup device 12 employs a 2-dimensional CCD.

The angular velocity sensor Z is located on the optical axis. The camera coordinate system is defined such that the direction of the optical axis is the Zs axis, the gravity direction is the Ys axis, and the horizontal direction perpendicular to both the Zs axis and the Ys axis is the Xs axis. The angular velocity sensors X, Y are respectively located on the Xs axis and the Ys axis. In the above camera coordinate system, the point of origin is at a center of the imaging surface of the CCD 12.

When an operator holds the camera 1 at a general position, the YZ plane becomes a vertical plane against a horizontal plane, and the Xs axis becomes a horizontal direction. The angular velocity sensor X is capable of detecting an up-and-down motion based on the camera shaking, which is referred to as shaking in a pitching direction as shown in the direction of an arrow A in FIG. 1. The angular velocity sensor X also detects the rotation around an axis in parallel with the Xs axis.

Similarly, the angular velocity sensor Y is capable of detecting a side-to-side motion based on the camera shaking, which is referred to as shaking in a yawing direction as shown in the direction of an arrow B in FIG. 1. The angular velocity sensor Y detects the rotation around an axis in parallel with the Ys axis.

Therefore, the angular speed sensors X and Y are capable of detecting the camera shaking corresponding to yawing and pitching based on the camera shaking. Furthermore, the angular velocity sensor Z is capable of detecting rotation around the Zs axis of the camera.

According to FIG. 1, the angular velocity sensor X is shown outside of the camera body 10 for the sake of the explanation of the present embodiment. However, the real position of the above angular velocity sensors X, Y, and Z is in the camera body 10.

Figure 2:
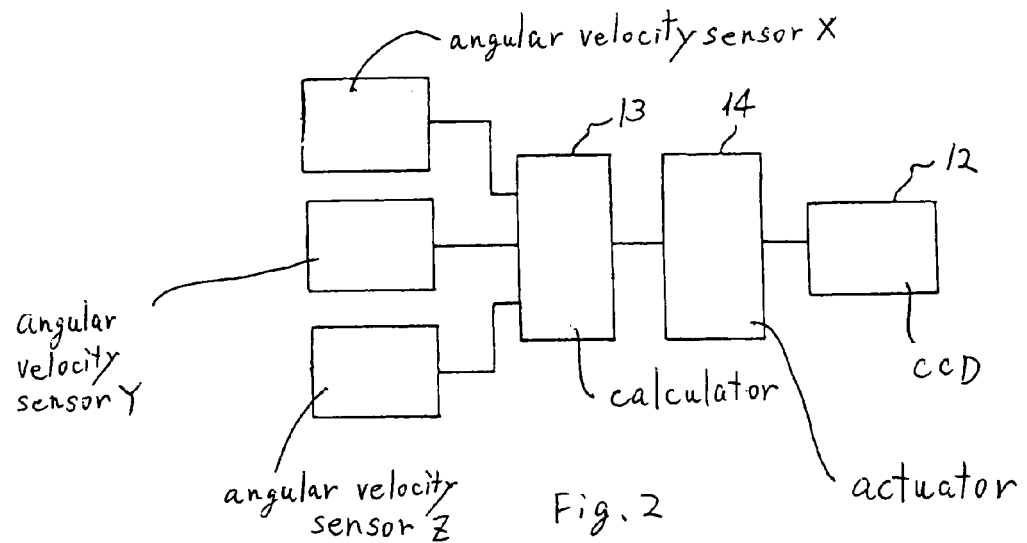
FIG. 2 is a block diagram for correcting camera shaking according to the present invention.

Now referring to FIG. 2, the shaking connection system is made up of the angular velocity sensor X, the angular velocity sensor Y, the angular velocity sensor Z, a calculator 13, an actuator 14, and the image pickup device 12, such as a CCD.

Figure 3:
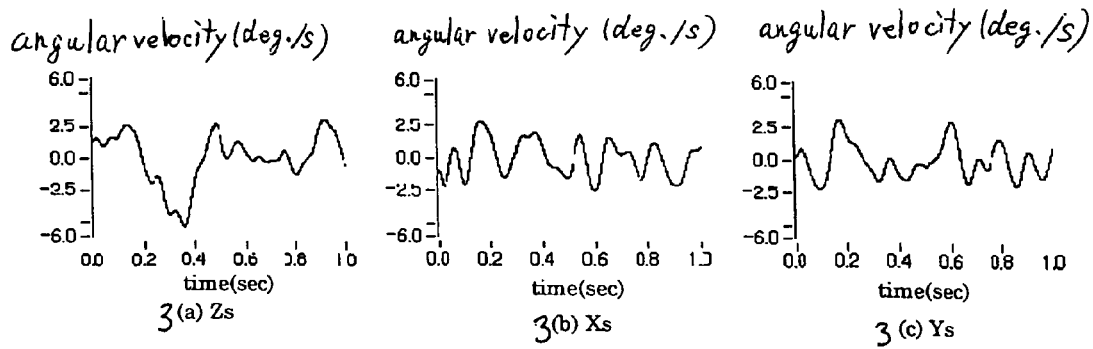
FIG. 3(a) is a spectrum of detected angular velocity by an angular velocity sensor X in the present invention.
FIG. 3(b) is a spectrum of detected angular velocity by an angular velocity sensor Y in the present invention.
FIG. 3(c) is a spectrum of detected angular velocity by an angular velocity sensor Z in the present invention.

Each angular velocity sensor detects the rotation around an axis in parallel with the Xs, Ys, Zs axes. The signals of each angular velocity sensors X, Y, Z are shown in FIGS. 3(a)–3(c). The calculator 13 calculates the adjustment values for the camera shaking according to the above signals. The actuator 14 actuates the CCD 12 or the position of lens 11 in the lens system based on the calculated correction value.

Referring to FIGS. 4(a) and 4(b), a second embodiment of the angular velocity sensors in the camera 1 with the correction mechanism is described. The camera according to the second embodiment has three pairs of acceleration sensors on each axis of the camera coordinates instead of the piezoelectric gyro sensors as in the first embodiment.

A pair of acceleration sensors X1, X2, a pair of acceleration sensors Y1, Y2, and a pair of acceleration sensors Z1, Z2 are located, respectively, on the Xs, Ys, and Zs axes. The camera 1 includes a camera body 10 and a lens 11. The pair of acceleration sensors X1, X2, the pair of acceleration sensors Y1, Y2, the pair of acceleration sensors Z1, Z2, an image pickup device 12 such as a CCD, a board 15 equipped with a controller 16, and actuators 17, 18 are set up in the camera body 10. The CCD 12 is supported on a support board 19 located on the board 15 via bimorph actuators 17 and 18. The camera 1 brings into focus a target object which is located at an object position (Ob). The image corresponding to the target object is focused at an imaging surface of the CCD 12 by lens 11.

The pair of acceleration sensors Z1, Z2 is located on the optical axis. The camera coordinate system is defined such that the direction of the optical axis is the Zs axis, the gravity direction is the Ys axis, and the horizontal direction perpendicular to both the Zs axis and the Ys axis is the Xs axis. In the above camera coordinate system, the point of origin is at a center of the imaging surface of the CCD 12.

When an operator holds the camera 1 at a general position, the YZ plane becomes a vertical plane against a horizontal plane, and the Xs axis becomes a horizontal direction. The pair of acceleration sensors Z1, Z2 is capable of detecting an up-and-down motion based on the camera shaking, which is referred to as shaking in a pitching direction as shown in the direction of an arrow A in FIG. 4(*a*). The pair of the acceleration sensors Z1, Z2 is located apart from each other at a predetermined distance in the optical direction. The pair of accelerator sensors Z1, Z2 detects the rotation around an axis in parallel with the Xs axis. Similarly, the pair of acceleration sensors X1, X2 is capable of detecting a side-to-side motion based on the camera shaking, which is referred to as shaking in a yawing direction as shown in the direction of an arrow B in FIG. 4(*a*). The pair of the acceleration sensors X1, X2 is located apart from each other at a predetermined distance in the Xs direction. The pair of acceleration sensors X1, X2 detects the rotation around an axis in parallel with the Ys axis.

Therefore, the two pairs of acceleration sensors Z1, Z2 and X1, X2 are capable of detecting the camera shaking corresponding to yawing and pitching which are susceptible to taking an image. Furthermore, the pair of acceleration sensors Y1, Y2 is capable of detecting rotation around the Zs axis of the camera shaking. The pair of the acceleration sensors Y1, Y2 is also located apart from each other at a predetermined distance in the Ys direction.

Figure 4:
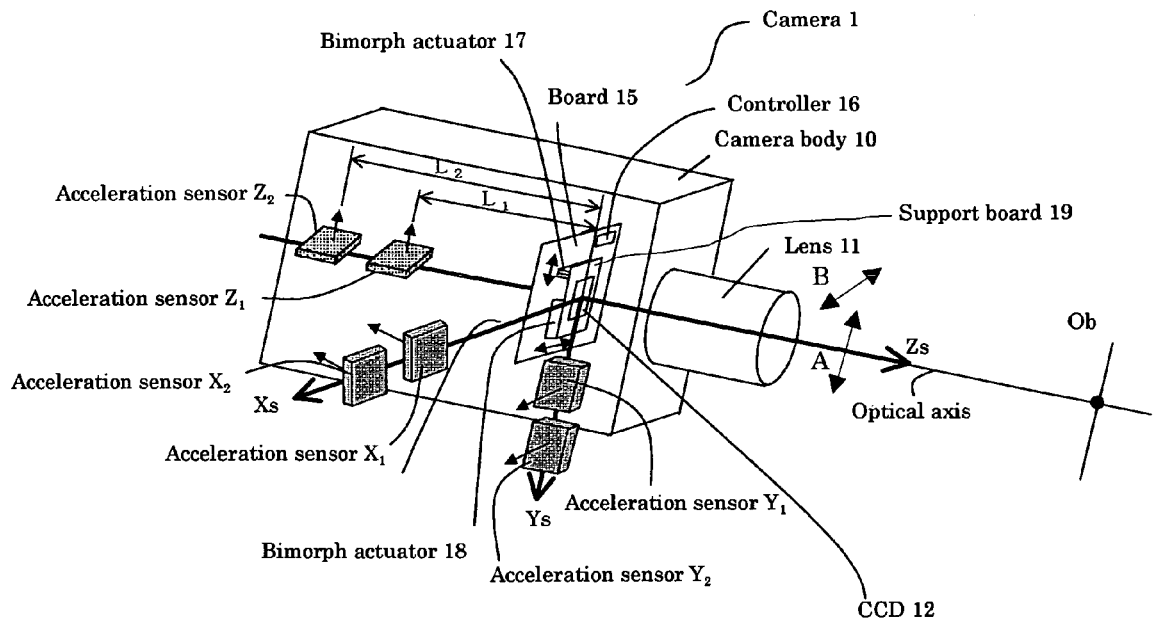
FIG. 4(a) is a perspective view of a camera according to a second embodiment of the present invention.
FIG. 4(b) shows a location between pairs of bimorph actuators and a CCD device in the present invention.
Figure 4:
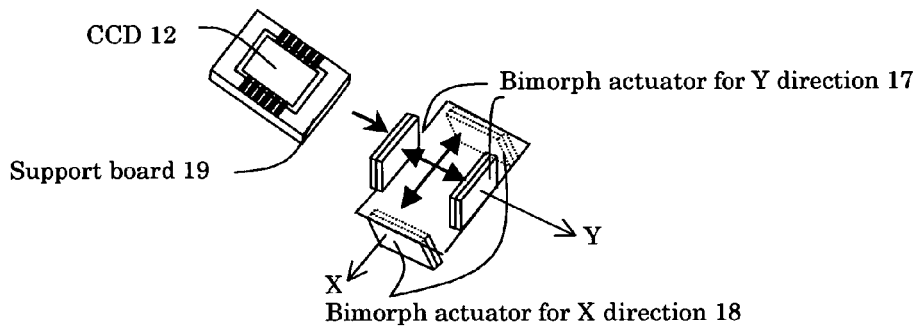

According to FIG. 4(*a*), the pair of acceleration sensors X1, X2 and the pair of acceleration sensors Y 1, Y2 are shown outside of the camera body 10 for the sake of the explanation of the present embodiment. However, the real position of the above pairs of acceleration sensors X1, X2 and Y1, Y2 is in the camera body 10.

Now referring to FIG. 4(*b*), the support board 19 is equipped with a pair of bimorph actuators 17 for the Y direction and a pair of bimorph actuators 18 for the X direction. The CCD 12 is located on the top of the pairs of bimorph actuators 17, 18 on an opposite side to the board 15. The position of the CCD device 12 is controlled based on the controller 16 equipped with the board 15. When the pair of bimorph actuators 18 for the Y direction is driven, the CCD device 12 moves along the Ys direction. When the pair of bimorph actuators 17 for the X direction is driven, the CCD device 12 moves along the Xs direction.

Figure 5:
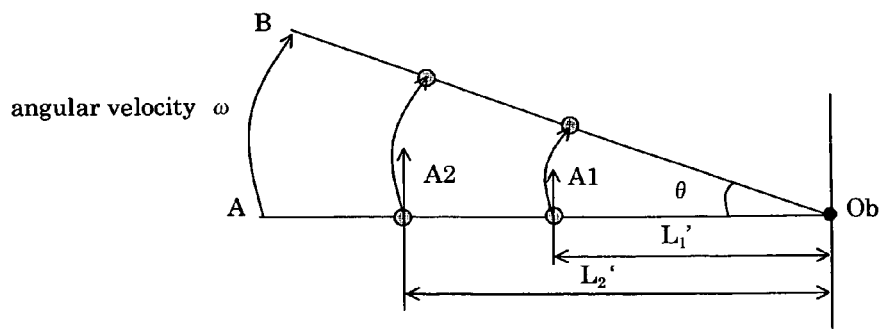
FIG. 5 is a cross-sectional view of a relation between outputs of acceleration sensors and a rotation angle according to the present invention.

Now referring to FIG. 5, the pair of acceleration sensors Z1, Z2 detects the camera shaking in the pitching direction according to the camera shaking. FIG. 5 shows a drawing of a cross-section of the YZ plane.

When the camera body 10 is inclined at an angle θ toward Ob in the YZ plane as a result of an up-and-down motion of the camera, the output of the acceleration sensor Z1 is acceleration A1 at a distance L1' from Ob, and the output of the acceleration sensor Z2 is acceleration A2 at a distance L2' from Ob. The accelerations A1 and A2 are described in the following equations (1) and (2). In the equations (1), (2), ω is rotation angular velocity, and t is time.

$$A2 = L'_1\left(\frac{d\omega}{dt}\right) \quad (1)$$

$$A2 = L'_2\left(\frac{d\omega}{dt}\right) \quad (2)$$

When equation (1) is subtracted from equation (2):

$$A2 - A1 = \left(\frac{d\omega}{dt}\right)(L'_2 - L'_1) \quad (3)$$

The distance (L2'-L1') equals the distance between the position of acceleration sensor Z1 and the position of the acceleration sensor Z2 (L2-L1). The distance (L2-L1) is a predetermined unique value for each camera. Further, the subtraction of the accelerations (A2-A1) can be calculated based upon the output of the pair of the acceleration sensors Z1, Z2. Therefore, the angular acceleration (dω/dt) can be obtained from the above equations (1), (2), (3).

Proceeding to a next step, before the exposure by the camera is carried out, a position of the camera 1 is defined as an initial position and an initial time is defined as t=0 at the initial position. During exposure, the angular acceleration (dω/dt) is integrated with respect to t between every time interval, which are divided plural time sectors from t=O to the total exposure time period. The angular velocity θ and the rotation angle θ are then calculated.

A camera shaking by rotation around an axis in parallel with the Ys axis based on the side-to-side motion of the camera is similarly calculated based upon the output of the pair of acceleration sensors X1, X2.

Figure 6:
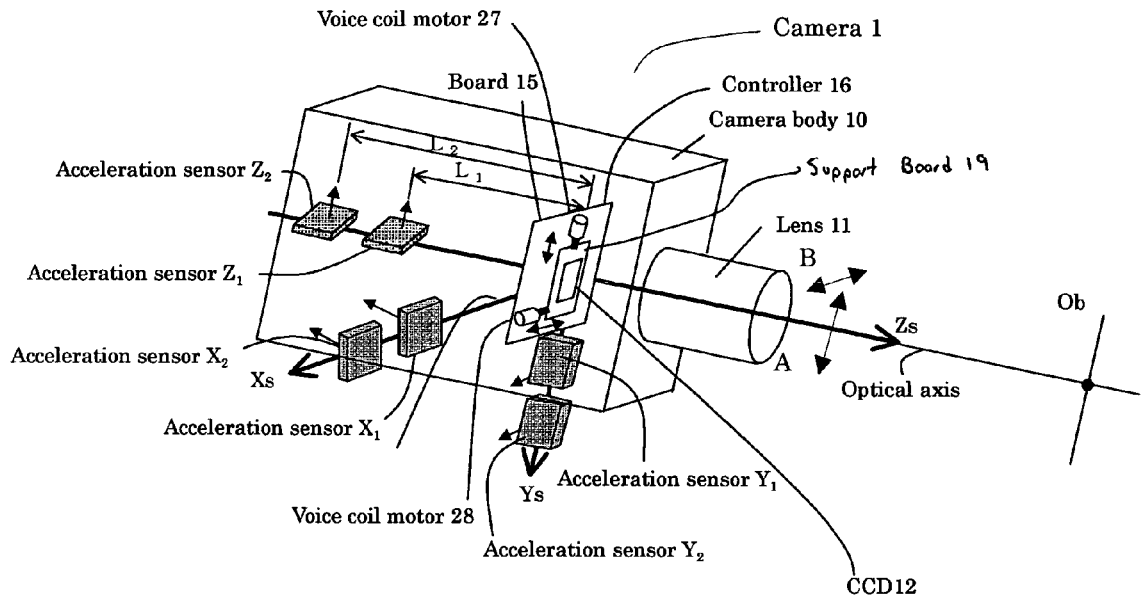
FIG. 6(a) is a perspective view of a camera according to a third embodiment of the present invention.
FIG. 6(b) is a cross-sectional view of an actuator for a CCD in the third embodiment of the present invention.
Figure 6:
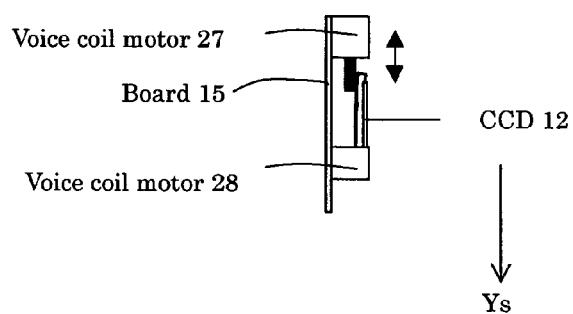

Now referring to FIG. 6, a third embodiment in which a pair of voice coil motors 27 is employed as actuators for driving the CCD 12 is described. A voice coil motor 27 is a driver for the position in the Ys direction of the CCD 12. The other voice coil motor 28 is a driver for the position in the Xs direction of the CCD 12. Both voice coil motors 27, 28 are attached to the support board 15 and adjust the position of the CCD 12 via the support board 15 under control of the controller 16 as shown FIG. 6(*a*). The other elements in FIGS. 6(*a*), 6(*b*) are the same as in the second embodiment, and therefore a redundant explanation except to the pair of the voice coil motors 27, 28 has been omitted.

Figure 7:
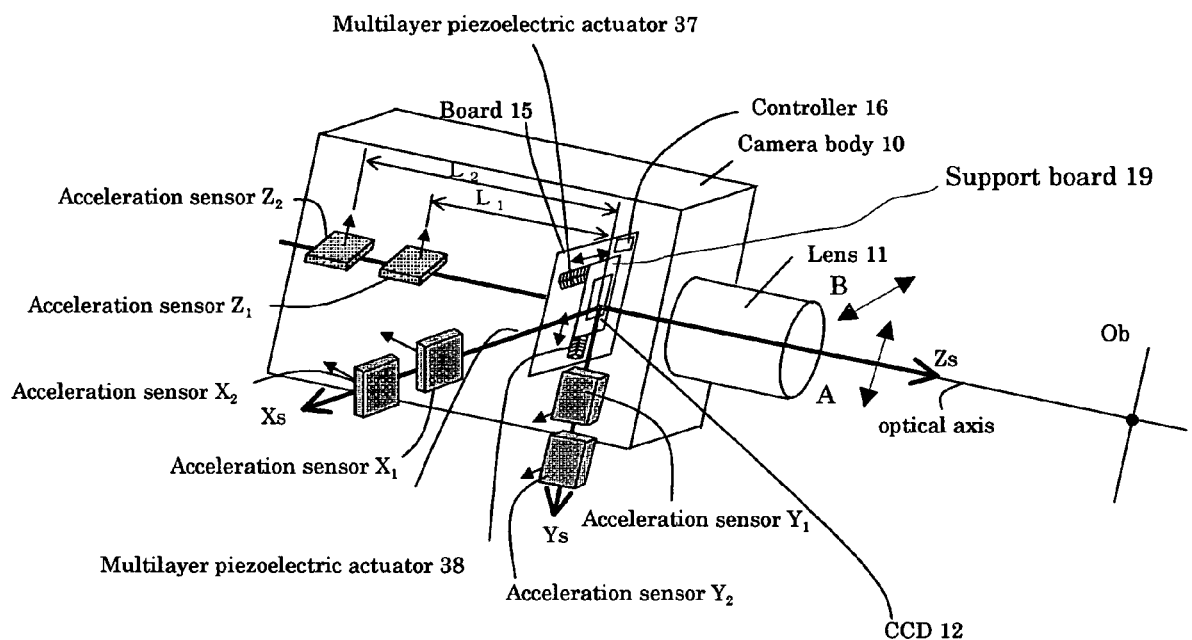
FIG. 7 is a perspective view of a camera according to a fourth embodiment of the present invention.

Now referring to FIG. 7, a fourth embodiment in which a pair of multilayer piezoelectric actuators 37, 38 is employed as actuators for driving the CCD 12 is described. The multilayer piezoelectric actuator 37 is a driver for the position in the Xs direction of the CCD 12. The other multilayer piezoelectric actuator 38 is a driver for the position in the Ys direction of the CCD 12. Both multilayer piezoelectric actuators 37, 38 are attached to the support board 19 and adjust the position of the CCD 12 via the support board 19 under control of the controller 16. The other elements in FIG. 7 are the same as in the second embodiment, and therefore a redundant explanation except of the pairs of the multilayer piezoelectric actuators 37, 38 has been omitted.

Figure 8:
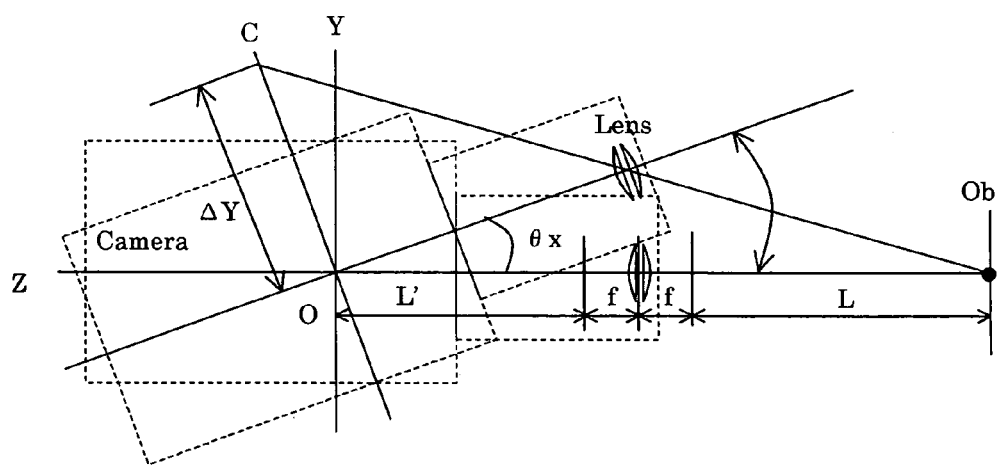
FIG. 8 is a cross-sectional view of a location of a camera body when a camera shakes around an X axis in the present invention.

Now referring to FIG. 8, when a rotation θx around an axis in parallel with the Xs axis occurs as a result of the camera shaking, a focus point of the object moves out from an initial point O to a point C. The amount of deviation between the initial point O and the point C is defined as ΔY.

The focus distance of the lens 11 is f. The distance L' is a distance between the focus point of the lens 11 and the image focusing point in the CCD 12. The distance L is a distance between the focus point of the lens 11 and the point of the object. A detail of the explanation of the distances L, L' is described in "Point To Note and How to Use of Optical Device in Order to Use the Optelectronics Technique", by Tetsuo Sueda, Optelectronics, P36–37, the contents of this reference being hereby incorporated herein by reference. A scaling β is defined as β=f/L, and L'=f²/L, leading to equation (4) below.

$$\Delta Y = (1+\beta)^2 \cdot \theta x \cdot f \quad (4)$$

The following equation (5) is derived from the above equation (4) differentiated with respect to time t.

$$\frac{d(\Delta Y)}{dt} = (1+\beta)^2 \cdot f \cdot \left(\frac{d\theta x}{dt}\right) \quad (5)$$

Similarly, the equation (6) is also derived from an equation differentiated with respect to time t when a rotation θy around an axis in parallel with the Ys axis occurs as a result of the camera shaking, and a focus point of the object moves out from the initial point O to point C.

$$\frac{d(\Delta X)}{dt} = (1+\beta)^2 \cdot f \cdot \left(\frac{d\theta y}{dt}\right) \quad (6)$$

The vales dθx/dt and dθy/dt can be derived from the integrated value of the dto/dt in the equations (1) and (2). Therefore, the values ΔX and ΔY are derived from the above equations. The values ΔX and ΔY are values that the distance of the image focusing point in the CCD 12 should be corrected by the adjustment of the position of the CCD 12, or the optical system.

Figure 9:
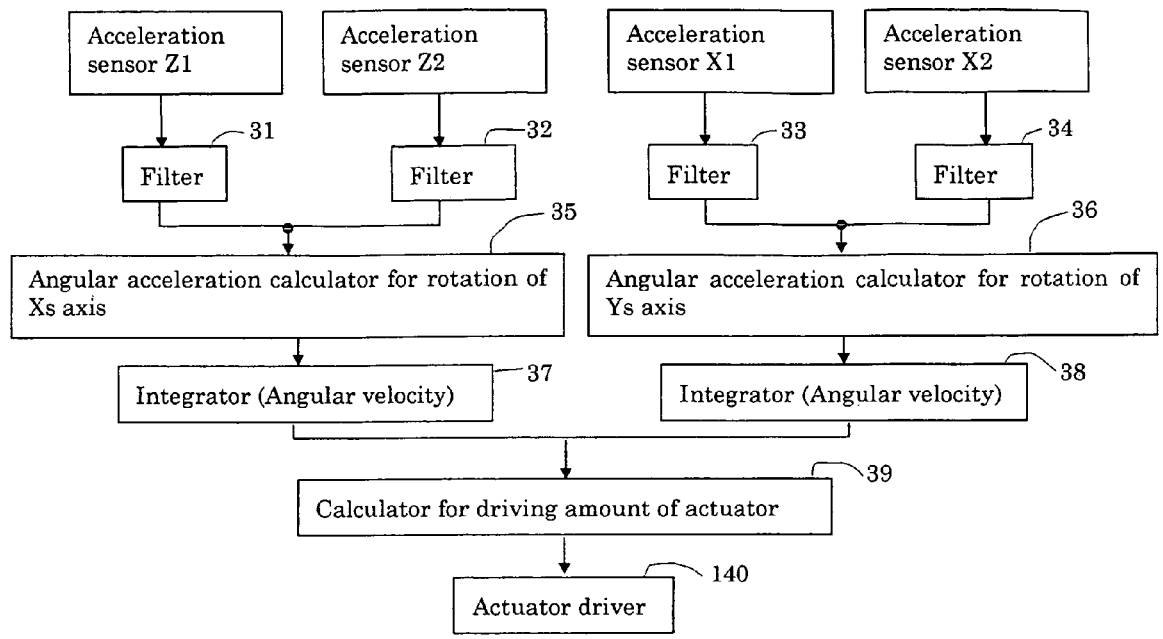
FIG. 9 is a block diagram for correcting a camera shaking according to the present invention.

Now referring to FIG. 9, the outputs of the pair of the acceleration sensors Z1, Z2 are input to filters 31, 32. The filters 31, 32 are made up of a low pass filter and a high pass filter. The high pass filter cuts a DC (direct current) component corresponding to the component of the gravity acceleration. The high pass filter is capable of reducing the offset noise at the position that the camera stands still. As another solution for reducing the offset noise at the position that the camera stands still, the system can detect the DC component of the camera shaking detector, and then subtract the DC component which is defined as the offset value from the detected signals.

The low pass filter of filters 31, 32 cuts the component of the frequency more than 20 Hz in the output of the acceleration sensors. A similar structure is employed for filters 33, 34 which receive outputs from the accelerator sensors X1, X2.

Figure 10:
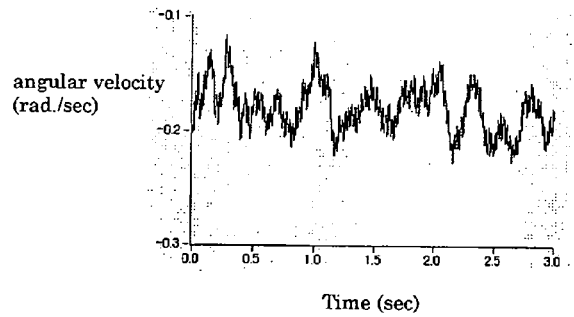
FIG. 10(a) is a spectrum of detected acceleration by acceleration sensors in the present invention.
FIG. 10(b) is a spectrum of frequency when a camera shaking occurs.
Figure 10:
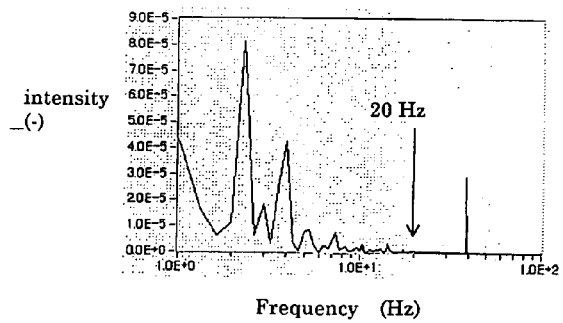

Referring to FIGS. 10(a) and 0(b), when the camera body is made of aluminum, the general deviation of the angular velocity according to time is described. The power spectrum corresponding to the deviation of the angular velocity is described in FIG. 10(b). The time deviation of the power spectrum of the angular velocity in the camera shaking depends on less than 20 Hz according to FIG. 10(b). Therefore, when a frequency component greater than 20 Hz of the power spectrum is cut by the low pass filter of filters 31, 32, the filter reduces noise or undesired signals, and finally gains the desired signal for the correction of the camera shaking.

Still referring to FIG. 9, the acceleration values reduced by the undesired signals by each filter 31, 32, 33, 34 is input to angular acceleration calculators 35 and 36. Angular acceleration calculators 35, 36 calculate the angular acceleration based upon the above equations. Each calculated angular acceleration is input to integrators 37 and 38. The integrators 37 and 38 integrate the angular acceleration into angular velocity based upon the above equations and further integrate the angular velocity into angles. A correction calculator 39 inputs the calculated angular velocity and the angle, and calculates the amount of movement of the actuators. An actuator driver 140 drives actuators according to the above amount of movement.

Finally, the CCD 12 is adjusted to the proper positioning based on the driving of the actuators.

Figure 11:
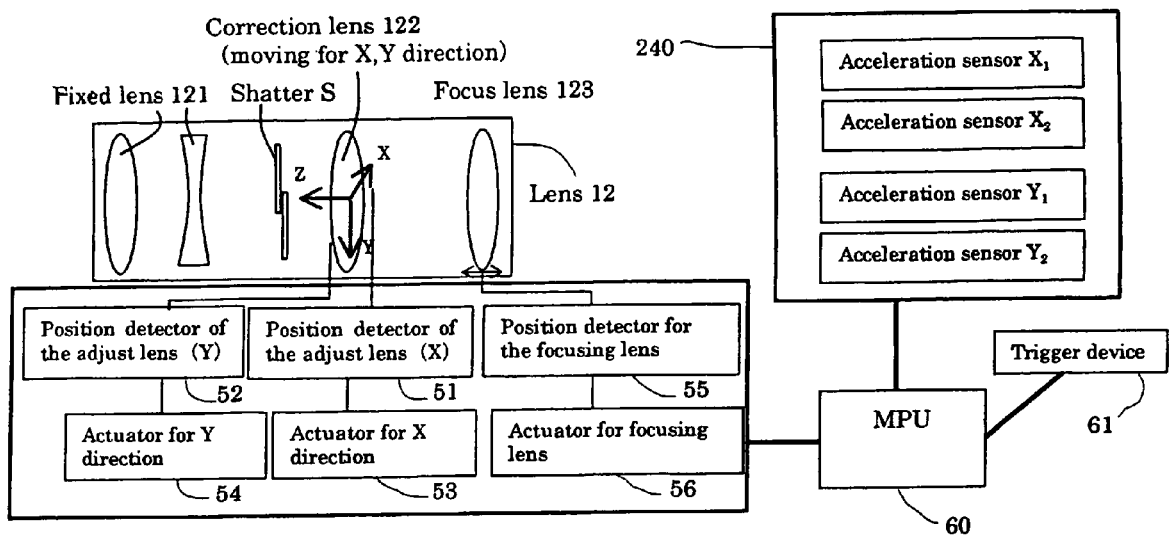
FIG. 11 is a block diagram for a total system in which a position of a correction lens is adjusted when camera shaking occurs in the present invention.

Now referring to FIG. 11, the lens 11 may be formed of a fixed lens 121, a shutter S, a correction lens 122, and a focus lens 123. The focus lens 123 is held in the lens 11, and can move toward the optical axis. After an actuator 56 moves the focus lens 123 along the optical axis, a position detector 55 detects the position of the focus lens 123 on the optical axis. The detected position data of the focus lens 123 is forwarded to a MPU 60. The MPU 60 then controls the position of the focus lens 123 according to control programs.

The correction lens 122 is a lens for adjustment of the camera shaking and is capable of moving within the XY plane that is perpendicular to the optical axis. An actuator 53 moves the correction lens 122 in the Xs axis. An actuator 54 moves the correction lens 122 in the Ys axis. The position detectors 51 and 52 can detect the position of the correction lens 122 after adjustment.

The actuators 53, 54 and position detectors 51, 52 are a part of a mechanical portion for the correction of the camera shaking. The MPU 60 is a part of a controller which drives the actuators 53, 54, 56 according to the acceleration detected by the pairs of acceleration sensors Y1, Y2 and X1, X2 in element 240 and position information of each position detector 51, 52, 55.

A trigger device 61, such as a shutter release button, generates a trigger signal when the shutter release button is pushed to a halfway position. When the trigger signal is generated, the controller inputs electric power into the acceleration sensors and the drivers of the actuators. The acceleration sensors and the drivers only require the electric power during taking a shot. Therefore, the electric power supply controlled according to the trigger signal avoids electric power loss.

The above embodiment is also capable of employing a magnetostriction device or an ultrasound motor, as other examples.

Figure 12:
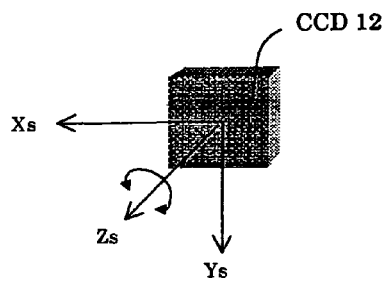
FIG. 12 is a perspective view of relation between camera coordinates and an image pickup device in the present invention.

Now referring to FIG. 12, the camera system is capable of rotating the image pickup device around the Zs axis in parallel with the optical axis by an actuator.

Figure 13:
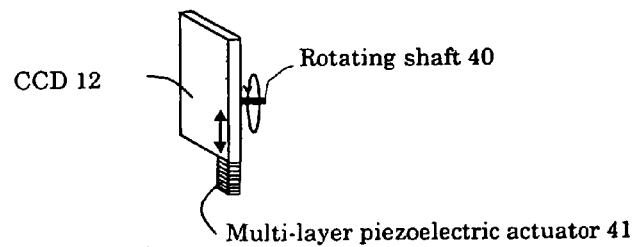
FIG. 13(a) shows a location between a multi-layer piezo-electric actuator, a rotating shaft, and a CCD device in the present invention.
FIG. 13(b) shows a location between a motor, a rotating shaft, and a CCD device in the present invention.
Figure 13:
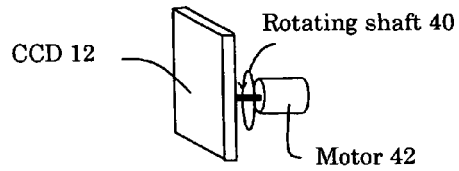

Referring to FIGS. 13(a), 13(b), some kinds of actuators for rotating the CCD 12 are disclosed. As shown in FIG. 13(a) a rotating shaft 40 is located on a point corresponding to the Zs axis and a multi-layer piezoelectric actuator 41 on the CCD 12. As shown in FIG. 13(b), the rotation shaft 40 is directly mounted on a motor 42. The motor 42 such as a stepping motor rotates the CCD 12 at a predetermined angle.

Figure 14:
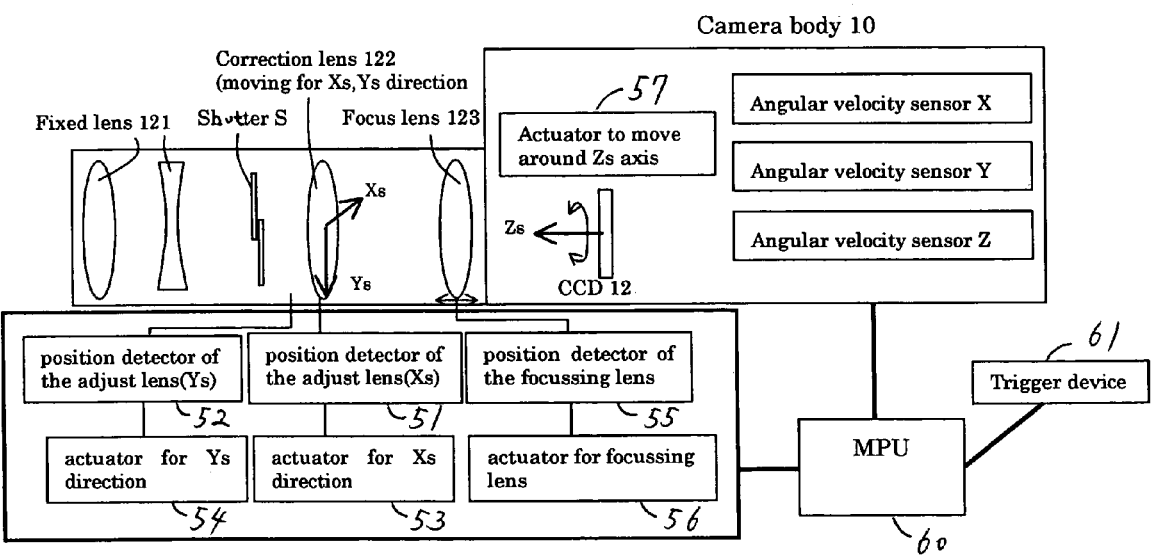
FIG. 14 is a block diagram for a total system in which a position of a correction lens and a position of a CCD device are adjusted when camera shaking occurs in the present invention.

Now referring to FIG. 14, the actuator for the CCD 12 rotating around the Zs axis is mounted on the CCD 12. When the MPU 60 receives the trigger signals from the trigger device 61, the angular velocity sensors X, Y, Z start to detect the angular velocity by the camera shaking under control of the MPU 60. The actuator 57 for rotating the CCD 12 around the Zs axis rotates the CCD 12 on the basis of the angular velocity detected by the angular velocity sensor Z. Finally, the CCD 12 is adjusted to the proper position.

The other elements in FIG. 14 are the same as in the third embodiment, and therefore a redundant explanation except to the actuator to move around the Zs axis has been omitted.

Figure 15:
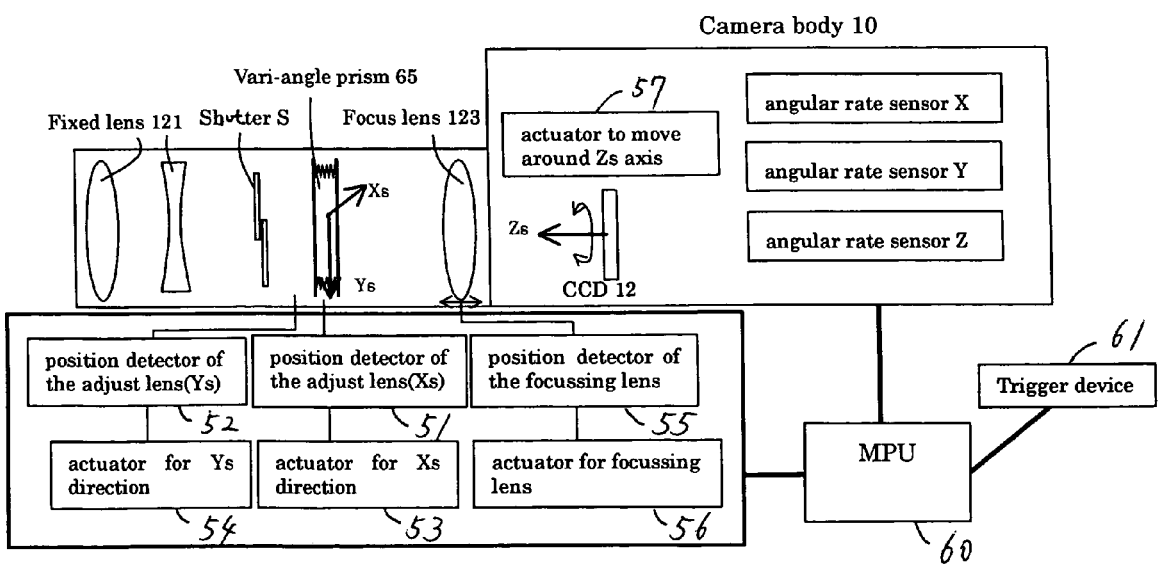
FIG. 15 is a block diagram for a total system in which a position of a correction lens is adjusted by a vari-angle prism and a position of a CCD device is adjusted when camera shaking occurs in the present invention.

Now referring to FIG. 15, in this embodiment the camera replaces the correction lens with a vari-angle prism 65.

Figure 16:
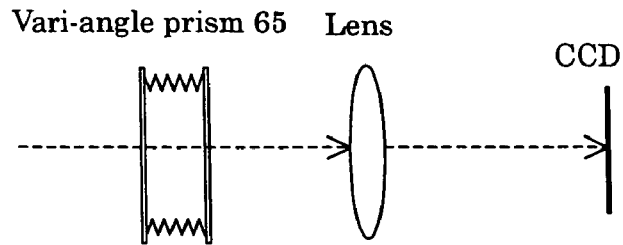
FIG. 16(a) is a cross-sectional view of an optical system in which a vari-angle prism is employed when camera shaking does not occur in the present invention.
FIG. 16(b) is a cross-sectional view of an optical system in which a vari-angle prism is employed when camera shaking occurs in the present invention.
Figure 16:
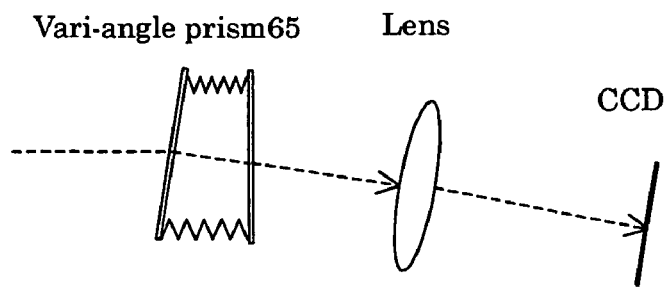

A vari-angle prism 65 is located in the optical system on the optical axis. The vari-angle prism can control a variable rotation angle as shown in FIGS. 16(a) and 16(b). The structure of the vari-angle prism 65 may be of two optically transparent boards connected with an accordion device to sandwich a liquid with a high refractive index with the transparent boards. The controller controls the variable rotation angle of the vari-angle prism 65 according to the camera shaking. One example of details of an explanation of the vari-angle prism can be found in WWW site URL "http://www.usa.canon.com/indtech/broadcasteq/vaplens.html", the contents of this reference being incorporated herein by reference.

Still referring to FIG. 16(a), when the camera shaking does not occur, the variable rotation angle equals zero. When the camera shaking does occur, the variable rotation angle is controlled according to the detected angular velocity, and calculated angular velocity, and angle under control of the controller as shown FIG. 16(b).

The other elements in FIG. 15 are the same as in the third embodiment, and therefore a redundant explanation except to the actuator to move around the Zs axis has been omitted.

Figure 17:
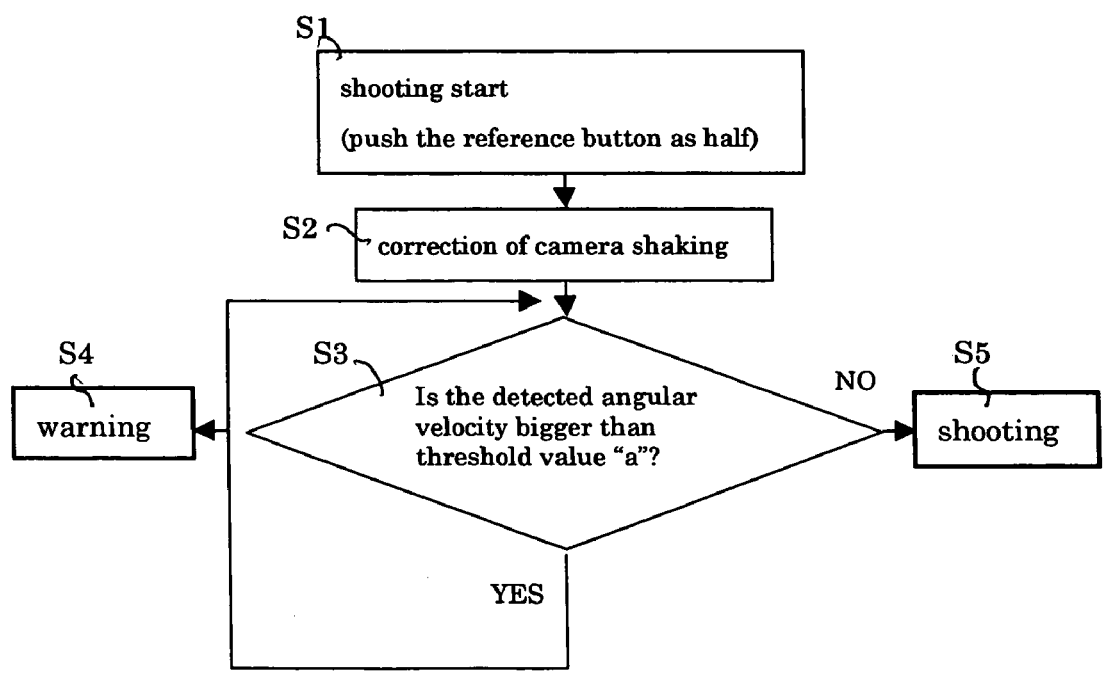
FIG. 17 is a flow chart for controlling correction of camera shaking based upon threshold values of angular velocity in the present invention.

Referring to FIG. 17, a flow chart describing a shooting operation with correction of the camera shaking is shown.

First, in a step S1, when the operator pushes a release button to a halfway position, the shooting is started. The operation then proceeds to a step S2, in which the correction of the camera shaking starts, and the process then proceed to a step S3. At step S3, the detected angular velocities by the angular velocity sensors are compared with a threshold value. When the detected angular velocities are greater than the threshold value, the process proceeds to a step S4. When the detected angular velocities are less than the threshold value, the process proceeds to a step S5, and the shooting is carried out with the correction of the camera shaking.

At the step S4, the system presents a warning to the operator.

Figure 18:
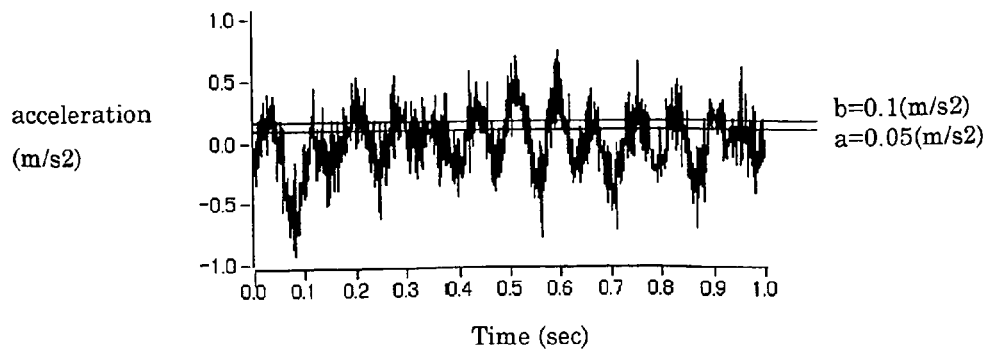
FIG. 18 is a spectrum of detected acceleration by acceleration sensors when camera shaking occurs in the present invention.

Now referring to FIG. 18, the acceleration detected by the acceleration sensors as angular velocity sensors varies with time. According to knowledge obtained empirically, the range of the acceleration that the shooting is possible, even if the correction of the camera shaking is not carried out, is less than 0.05 m/s$^2$. Furthermore, the range of the acceleration that the shooting is possible by only camera parameters such as an aperture, shutter speed, zoom power, etc., are adjusted, is between 0.05 m/s$^2$ and 0.1 m/s$^2$.

When the range of the acceleration exceeds 0.1 m/s$^2$, the camera needs the correction of the camera shaking.

Figure 19:
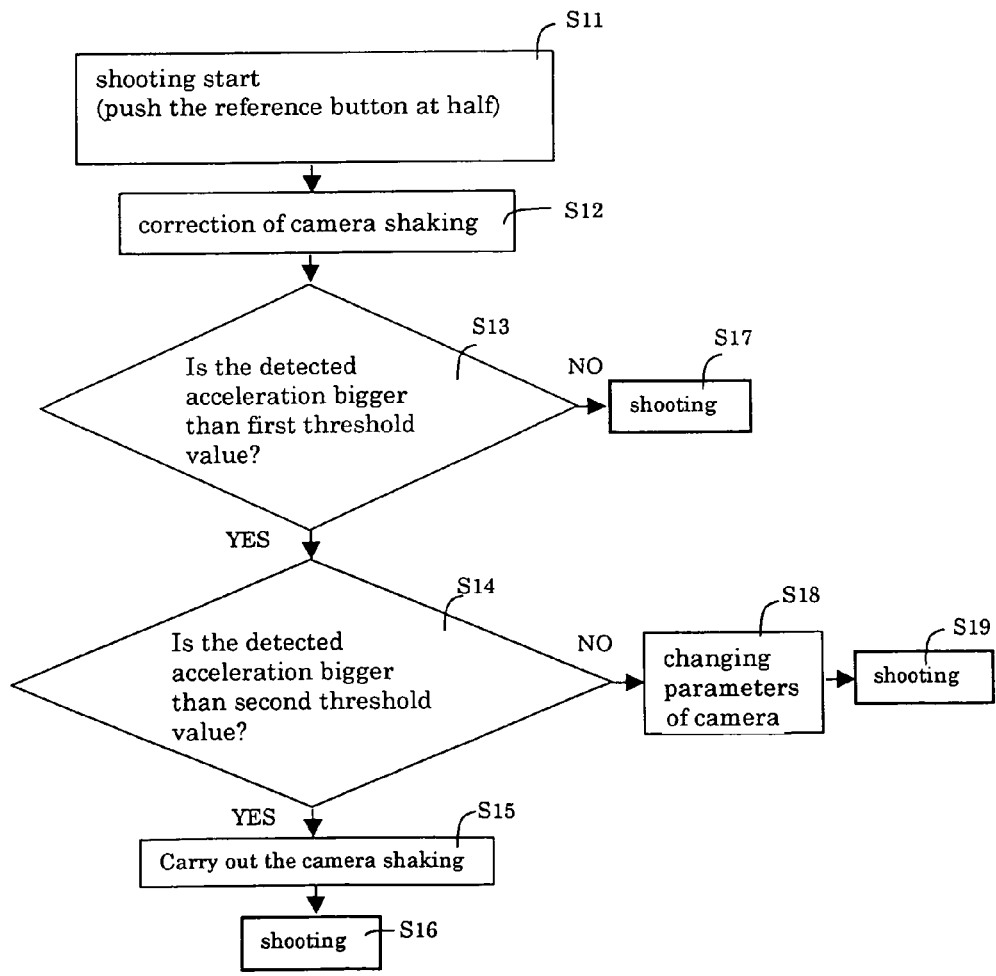
FIG. 19 is a flow chart for controlling correction of camera shaking based upon threshold values of acceleration in the present invention.

Referring to FIG. 19, a flow chart describing a shooting operation with correction of the camera shaking is shown.

First, in a step S11, when the operator pushes a release button to a halfway position, the shooting is started. The operation then proceeds to a step S12, in which the correction of the camera shaking starts, and the process then proceeds to a step S13. At step S13, the detected accelerations by the acceleration sensors are compared with a first threshold value (e.g. 0.05 m/s$^2$). When the detected accelerations are greater than the first threshold value, the process proceeds to a step S14. When the detected accelerations are less than the first threshold value, the process proceeds to a step S17, and the shooting is carried out without the correction of the camera shaking.

At the step S14, the detected accelerations are further compared with a second threshold value (e.g. 0.1 $\mu$m/s$^2$). When the detected accelerations are greater than the second threshold value, the process proceeds to a step S15. When the detected acceleration is less than the second threshold value, the process proceeds to a step S18 and the camera parameters, such as shutter speed, zoom power, etc., are changed, and the process then proceeds to a step S19. At the step S19, the shooting is carried out.

At the step S15, the correction of the camera shaking is carried out and the process proceeds to a step S16. At the step S16, the shooting is carried out.

Figure 20:
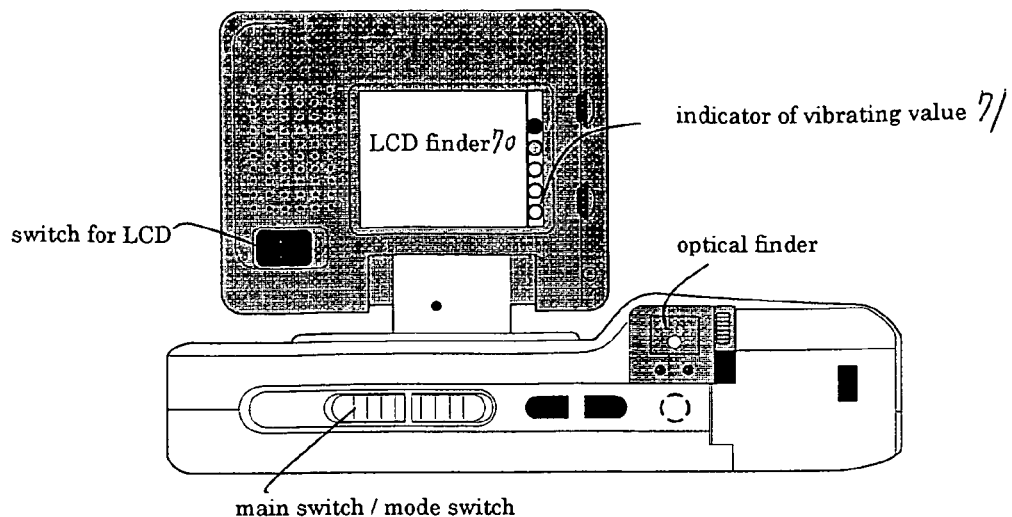
FIG. 20 shows a structure of a digital camera in the present invention.

Now referring to FIG. 20, a LCD (Liquid Crystal Display) finder 70 is equipped with the digital camera. Levels of the camera shaking are indicated in the right side of the LCD finder 70. In this embodiment, there are five levels. The angles are calculated by integration of the angular velocities $\omega x$, $\omega y$, $\omega z$. The maximum value among the three angles is compared with threshold values. When the value of the maximum angle value becomes big, a higher position on the LCD finder 70 is lighted.

If the detected angular velocity or detected acceleration is more than the second threshold, the highest position of the LCD finder 70 is lighted and a warning is presented to the user by an indication. Therefore, the user can determine the level of the camera shaking by the indicator 71 in the LCD finder 70.

Figure 21:
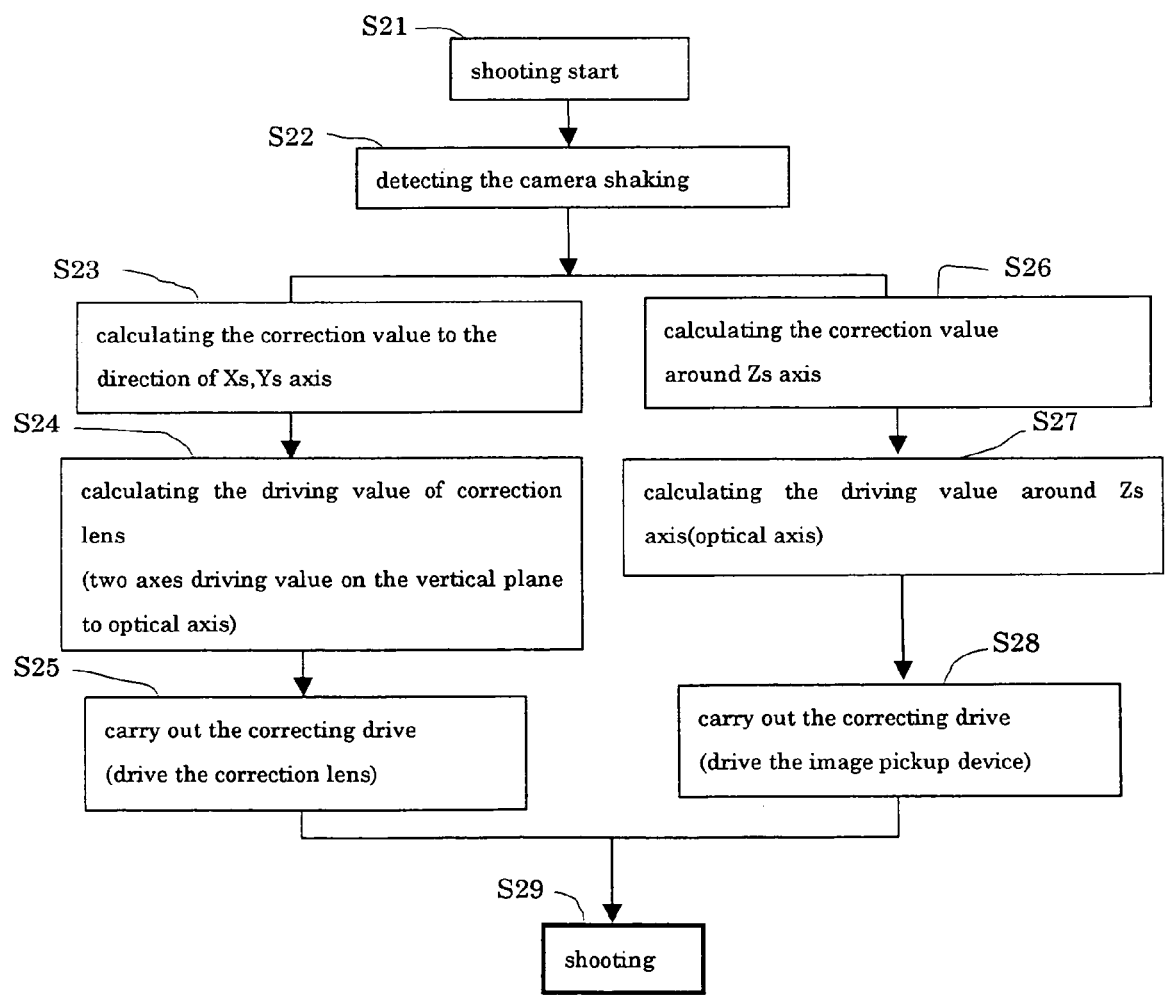
FIG. 21 is a flow chart for controlling correction of camera shaking detected by the angular velocities corresponding to three directions in the present invention.

Now referring to FIG. 21, a flow chart describing a shooting operation with correction of the camera shaking based on three angular velocities corresponding to all the axes is shown.

At a step S21, when the operator pushes a release button to a halfway position, the shooting is started. The process then proceeds to a step S22. At step S22, the acceleration sensors or the piezoelectric gyro sensors detect angular velocities in the direction of the Xs, Ys, and Zs axes. The process then concurrently proceeds to steps S23 and S26.

At the step S23, the correction value of the Xs and Ys axes directions are calculated, and then the process proceeds to a step S24. At the step S24, a driving value of the position of the correction lens 122 or adjustment value of the vari-angle prism 65 is calculated, and the process then proceeds to a step S25. The correction of the position of the correction lens 122 or the adjustment of the vari-angle prism 65 is carried out at the step S25. The process then proceeds to a step S29.

On the other hand, at the step S26, the rotation value of the Zs axis is calculated, and then the process proceeds to a step S27. At the step S27, the rotation angle around Zs axis is carried out. The process then proceeds to a step S28. The adjustment of the rotating position of the CCD 12 is carried out at the step S28 and the process then proceeds to a step S29, and finally the shooting is carried out after the correction of the camera shaking.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts, as well as implementation in software, hardware, or a combination of both within the principles of the present invention to the full extent indicated by the broad general meaning of the terms in which the appended claims are expressed.

The present document is based on Japanese priority document 10-253,657 filed in the Japanese Patent Office on Sep. 8, 1998, the entire contents of which are incorporated herein by reference.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An apparatus for detecting a deviation of a camera from shaking, comprising:
   a shaking detector configured to detect a shaking of the camera based upon an output from at least a first pair of acceleration sensors located on an optical axis of the camera, a second pair of acceleration sensors located on an axis in the gravity direction, and a third pair of acceleration sensors located on an axis perpendicular to the optical axis and the axis in the gravity direction;
   a calculator configured to calculate rotation angles of each of said coordinate axes based on the output of the three pairs of acceleration sensors;
   a deviation correction device including a positionable optical element configured to be repositioned in an XY plane perpendicular to an optical axis of the camera based on the rotation angles calculated by the calculator; and
   a rotation regulator configured to rotate an image pickup device around a Z axis corresponding to the optical axis of the camera or an axis in parallel with the optical axis.

2. An apparatus for detecting a deviation of a camera from shaking according to claim 1, wherein the positionable optical element is one of a correction lens and a vari-angle prism.

3. An apparatus for detecting a deviation of a camera from shaking according to claim 1, wherein one of the coordinate axes of the camera coordinates is an optical axis of the camera.

4. An apparatus for detecting a deviation of a camera from shaking according to claim 3, wherein at least one of the angular velocity sensors is located on the optical axis of the camera.

5. An apparatus for detecting a deviation of a camera from shaking according to claim 4, wherein at least one of the angular velocity sensors is located on a horizontal axis of the camera.

6. An apparatus for detecting a deviation of a camera from shaking according to claim 3, further comprising:
   a low pass filter configured to reject a frequency band over 20 Hz from outputs of the angular velocity sensors.

7. An apparatus for detecting a deviation of a camera from shaking according to claim 1, further comprising:
   a low pass filter configured to reject a frequency band over 20 Hz from outputs of the angular velocity sensors.

8. An apparatus for detecting a deviation of a camera from shaking according to claim 7, wherein a first angular velocity sensor is located on an optical axis of the camera to detect deviation in a vertical direction, and a second angular velocity sensor detects deviation in a horizontal direction.

9. An apparatus for detecting a deviation of a camera from shaking according to claim 1, wherein the deviation correcting device adjusts a position of a lens as the positionable optical element in an optical system of the camera based on the rotation angles calculated by the calculator.

10. An apparatus for detecting a deviation of a camera from shaking according to claim 1, wherein the deviation correcting device adjusts a vari-angle of a vari-angle prism located on an optical axis of the camera as the positionable optical element based on the rotation angles calculated by the calculator.

11. An apparatus for detecting a deviation of a camera from shaking according to claim 1, wherein the deviation correcting device adjusts a position of an imaging sensor of the camera based on the rotation angles calculated by the calculator.

12. An apparatus for detecting a deviation of a camera from shaking according to claim 1, wherein the rotation regulator includes a rotating shaft located on a point corresponding to the Z axis and a multi-layer piezoelectric actuator on the image pickup device.

13. An apparatus for detecting a deviation of a camera from shaking according to claim 1, wherein the rotation regulator includes a rotating shaft mounted on a motor that rotates the image pickup device at a predetermined angle.

14. An apparatus for detecting a deviation of a camera from shaking, comprising:
   detecting means for detecting a shaking of the camera based upon an output from at least a first pair of acceleration sensor means located on an optical axis of the camera, a second pair of acceleration sensor means located on an axis in the gravity direction, and a third pair of acceleration sensor means located on an axis perpendicular to the optical axis and the axis in the gravity direction;
   calculator means for calculating tilt angles of each of said coordinate axes based on the output of the three pairs of acceleration sensor means;
   deviation correcting means including a positionable optical element for repositioning in an XY plane perpendicular to an optical axis of the camera based on a detected shaking of the camera; and
   rotation regulator means for rotating an image pickup means around a Z axis corresponding to the optical axis of the camera or an axis in parallel with the optical axis.

15. An apparatus for detecting a deviation of a camera from shaking according to claim 14, wherein the positionable optical element is one of a correction lens and a vari-angle prism.

16. An apparatus for detecting a deviation of a camera from shaking according to claim 15, further comprising:
   low pass filter means for rejecting a frequency band over 20 Hz from outputs of the angular velocity sensor means.

17. An apparatus for detecting a deviation of a camera from shaking according to claim 16, wherein one of the coordinate axes of the camera coordinates is an optical axis of the camera.

18. An apparatus for detecting a deviation of a camera from shaking according to claim 17, wherein at least one of the angular velocity sensors is located on an axis in parallel with the optical axis of the camera.

19. An apparatus for detecting a deviation of a camera from shaking according to claim 18, wherein one of the angular velocity sensor means is located on a horizontal axis of the camera coordinate.

20. An apparatus for detecting a deviation of a camera from shaking according to claim 16, wherein the rotation regulator means includes a rotating shaft located on a point corresponding to the Z axis and a multi-layer piezoelectric actuator on the image pickup means.

21. An apparatus for detecting a deviation of a camera from shaking according to claim 16, wherein the rotation regulator means includes a rotating shaft mounted on a motor that rotates the image pickup means at a predetermined angle.

22. An apparatus for detecting a deviation of a camera from shaking according to claim 14, wherein the deviation correcting means adjusts a position of a lens means as the positionable optical element in an optical system of the camera based on the tilt angles calculated by the calculator means.

23. An apparatus for detecting a deviation of a camera from shaking according to claim 14, wherein the deviation correcting means adjusts a vari-angle of a vari-angle prism means located on an optical axis of the camera as the positionable optical element based upon the tilt angles calculated by the calculator means.

24. An apparatus for detecting a deviation of a camera from shaking according to claim 14, wherein the deviation correcting means adjusts a position of an imaging means of the camera based on the tilt angles calculated by the calculator means.

* * * * *